United States Patent
Kamata et al.

(10) Patent No.: US 8,568,835 B2
(45) Date of Patent: Oct. 29, 2013

(54) APPARATUS FOR COLORING ELECTRIC WIRE AND METHOD THEREOF

(75) Inventors: Takeshi Kamata, Shizuoka (JP); Keigo Sugimura, Shizuoka (JP); Sei Saito, Shizuoka (JP); Kiyoshi Yagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 779 days.

(21) Appl. No.: 11/628,502

(22) PCT Filed: Jun. 2, 2005

(86) PCT No.: PCT/JP2005/010148
§ 371 (c)(1),
(2), (4) Date: Oct. 10, 2007

(87) PCT Pub. No.: WO2005/122189
PCT Pub. Date: Dec. 22, 2005

(65) Prior Publication Data
US 2008/0134968 A1 Jun. 12, 2008

(30) Foreign Application Priority Data
Jun. 7, 2004 (JP) .................. 2004-168980

(51) Int. Cl.
*B05D 1/36* (2006.01)
*B05D 1/02* (2006.01)

(52) U.S. Cl.
USPC ............ 427/427.4; 427/421.1; 427/287; 427/258; 427/117

(58) Field of Classification Search
None
See application file for complete search history.

(56) References Cited

U.S. PATENT DOCUMENTS

| 7,331,654 B2 * | 2/2008 | Horsnell et al. ............... 347/54 |
| 2004/0003741 A1 * | 1/2004 | Iskra et al. ..................... 101/487 |
| 2004/0004303 A1 * | 1/2004 | Iskra ............................. 264/109 |

FOREIGN PATENT DOCUMENTS

| JP | 5-111947 | 5/1993 |
| JP | 6-119833 | 4/1994 |
| JP | 9-92056 | 4/1997 |
| JP | 11-153245 | 6/1999 |
| JP | 2001-280189 | 10/2001 |
| JP | 2002-309991 | 10/2002 |
| JP | 2004-134371 | 4/2004 |
| JP | 2004134371 A * | 4/2004 |
| WO | WO 03/019580 A1 | 3/2003 |
| WO | WO 03/033951 | 4/2003 |

OTHER PUBLICATIONS

Computer Translation of JP 2004-134371.*
Supplementary European Search Report mailed Jul. 9, 2008 in corresponding application (3 pages).

* cited by examiner

*Primary Examiner* — David Turocy
(74) *Attorney, Agent, or Firm* — Kratz, Quintos & Hanson, LLP

(57) ABSTRACT

An object of the present invention is to provide an apparatus and a method for injecting assuredly a given amount of a coloring agent to an outer surface of an electric wire and coloring it. An apparatus for coloring an electric wire 1 includes coloring nozzles 31. The coloring nozzles 31 each has a solenoid valve 51 to inject or stop injection of a coloring agent to an outer surface 3*a* of an electric wire by opening or closing the solenoid valve. A spike voltage is applied to a coil 40 of the solenoid valve 51 when the coloring agent is injected. The spike voltage is a voltage applied to the coil 40 which is necessary to open the solenoid valve 51. The spike voltage is applied to the coil 40 to open the solenoid valve 51 and stopped after a given period of time.

4 Claims, 9 Drawing Sheets

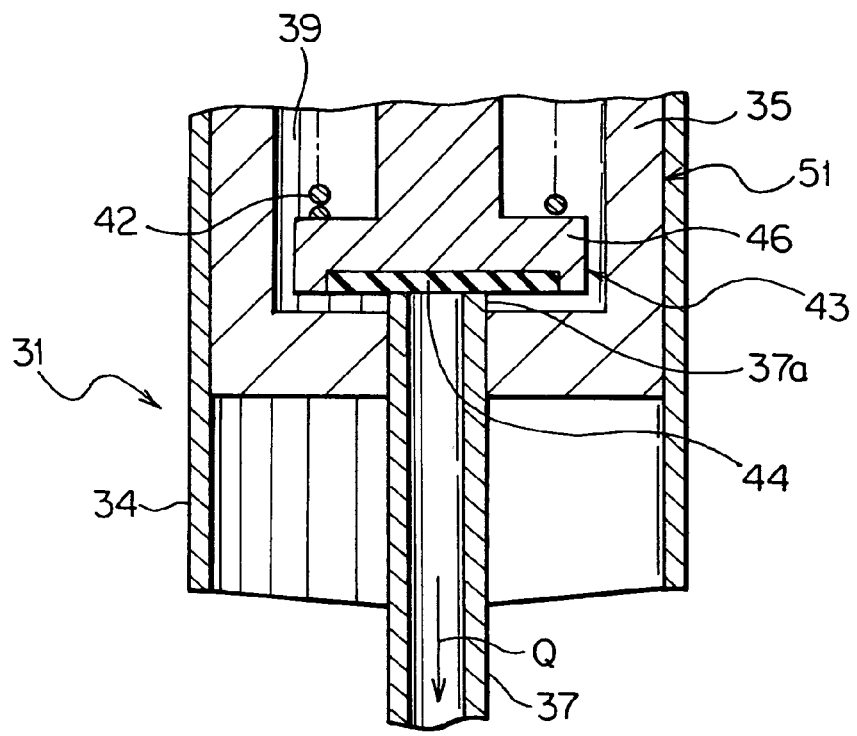
F I G. 5 A
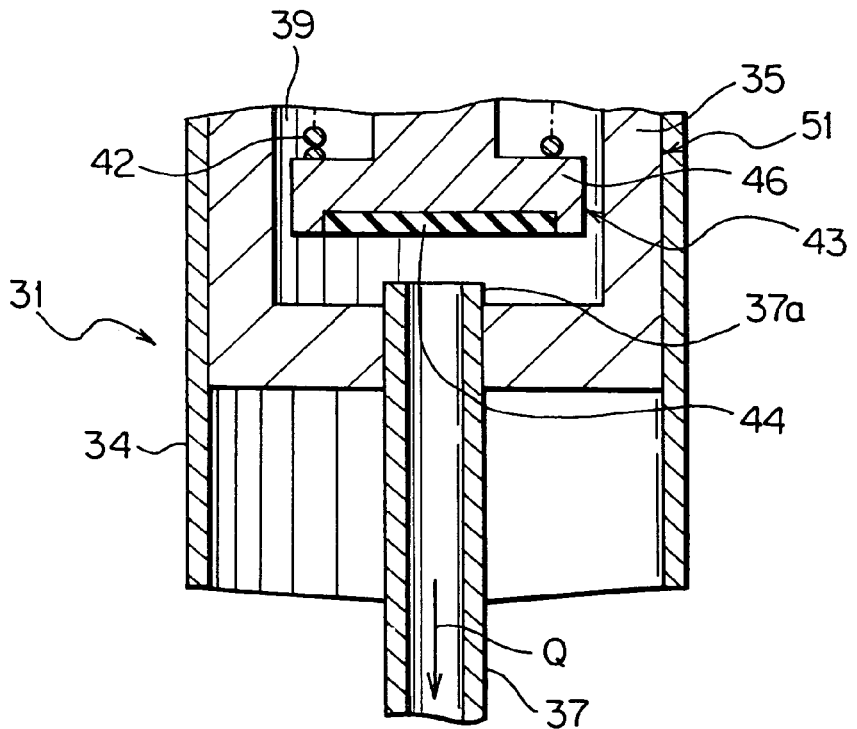
F I G. 5 B

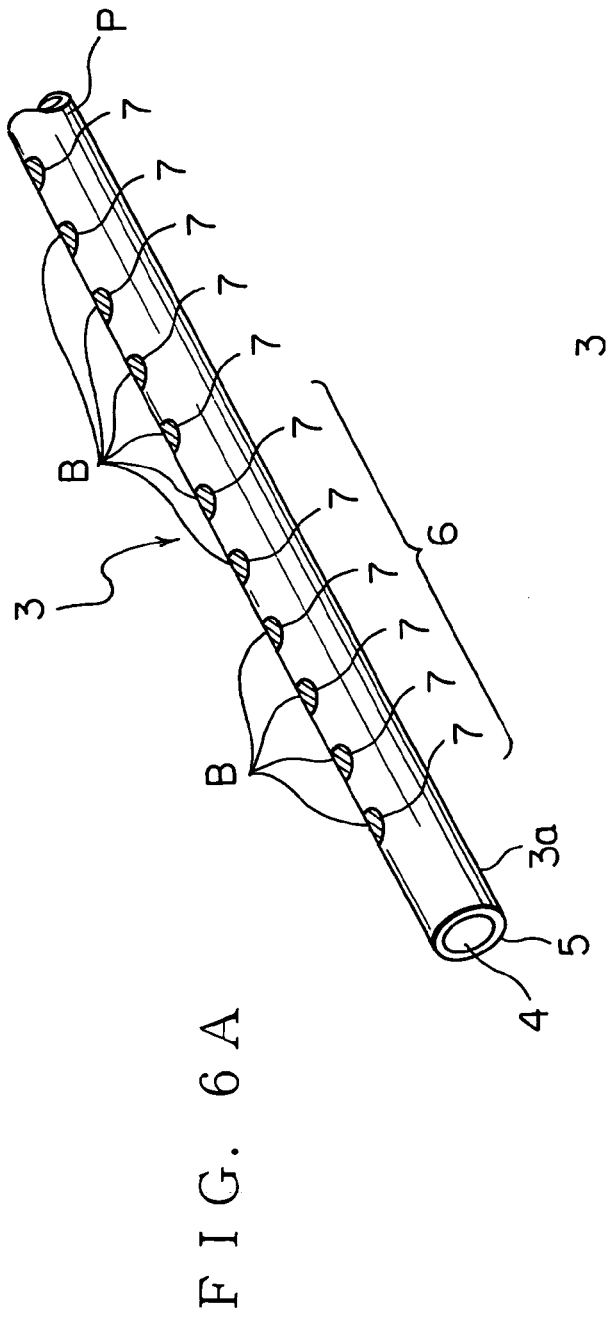
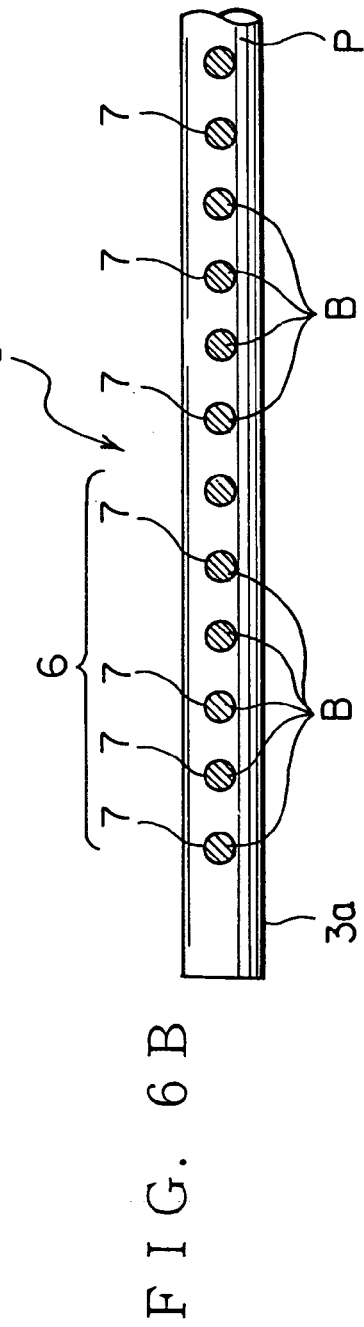
FIG. 6A
FIG. 6B

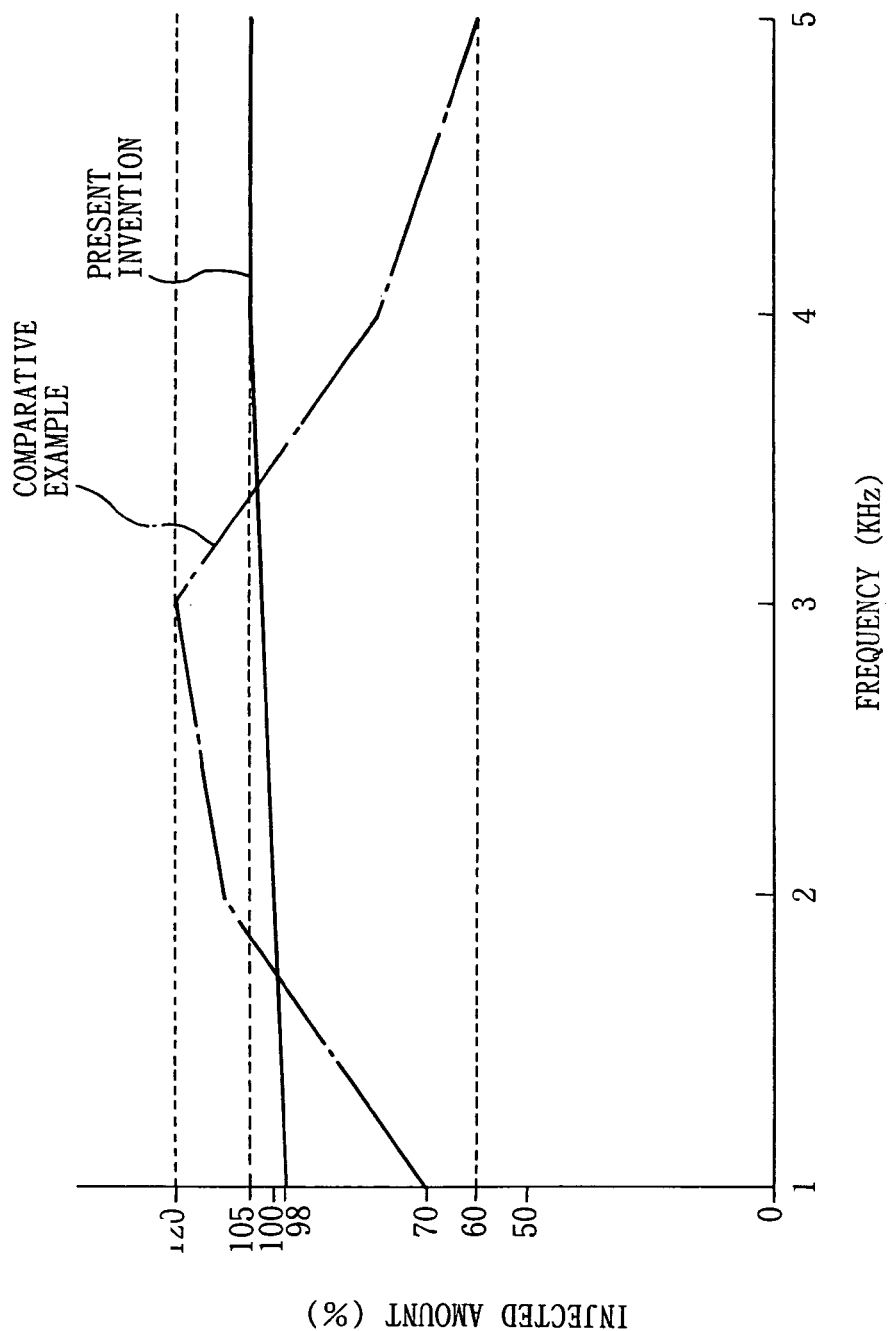
F I G. 7

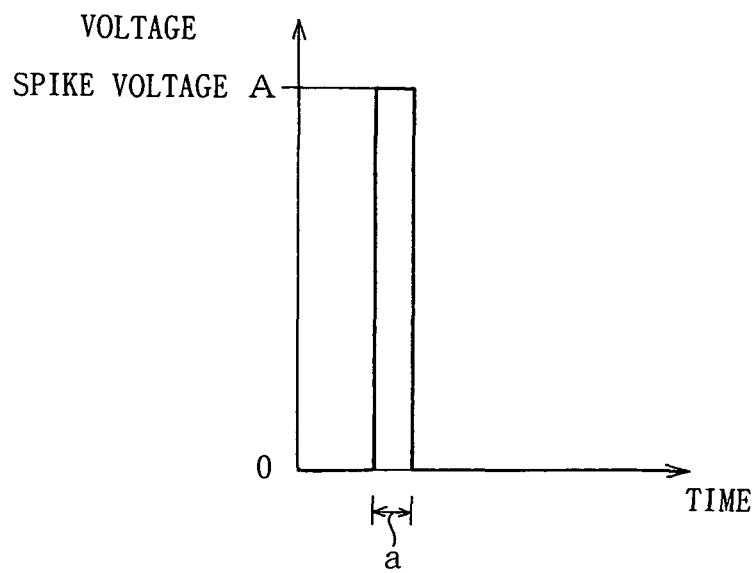
F I G. 9
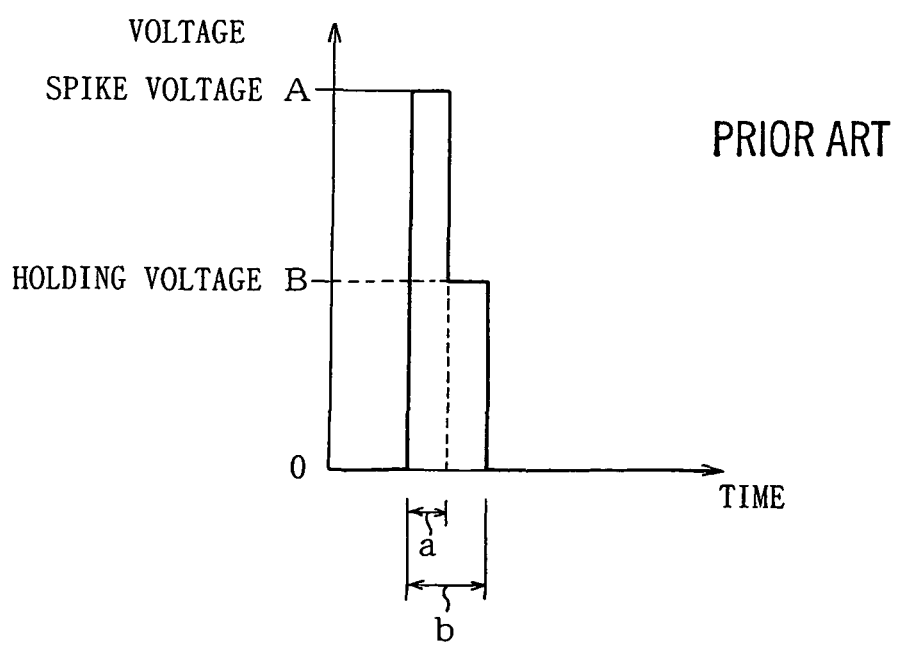
F I G. 10

12
APPARATUS FOR COLORING ELECTRIC WIRE AND METHOD THEREOF

TECHNICAL FIELD

The present invention relates to an apparatus and a method for coloring an electric wire which includes a core wire and an insulating sheath covering the core wire.

RELATED ART

Various types of electronic units are mounted on a motor car as a moving body. The motor car includes wiring harnesses to provide electric power from a power source and control signals from a computer to the electronic units. The wiring harness includes a plurality of electric wires and a connector attached to ends of the electric wires.

The electric wire has a conductive core wire and a sheath made of an insulating synthetic resin for covering the core wire. The electric wire is a so-called sheathed wire. The connector has terminals and an connector housing to receive the terminals. The terminals made of a conductive metal sheet are fixed to the ends of the electric wires to be connected with the core wires of the electric wires. The connector housing is made of a synthetic resin and has a box shape. The electronic units are connected to the terminals in the connector housing through the electric wires in order to receive the electric powers and signals.

When assembling the wiring harness, the electric wires are cut into a given length and the sheaths of the ends of the electric wires are removed and the terminals are fixed to the ends thereof. The electric wires could be connected to each other if necessary. Then, the terminals are inserted into the connector housing. The wiring harness are assembled in this manner.

It is necessary to identify the electric wires of the wiring harness with respect to a size of the core wire, material of the sheath (the material may vary depending on presence of heat resisting property or so), an object for use. The object for use means, for example, a system of the motor car having the electric wires to supply the control signals for an air bag, an ABS (Antilock Brake System) and vehicle speed information, and the electric powers.

A coloring of the sheath of the electric wire is formed by extruding the synthetic resin, which consists a desired coloring agent, around the core wire (for example, Patent Document 1 or 3). Whenever a color of an outer surface of the electric wire is changed, it is necessary to stop the operation of the sheath apparatus to extrude. It increases cost and time to produce the electric wires and reduces the productivity.

The coloring agent contained in the synthetic resin is changed during the sheath extrusion of the apparatus. Hence, right after changing the color, the sheath of the electric wire has a mixed color of the preceding and the changed coloring agents. It reduces a material yield of the electric wire.

In order to avoid the low productivity and low material yield of the electric wire, the applicant of the present invention proposed to produce a single color electric wire and color a desired color on an outer surface of the electric wire if necessary and assemble a wiring harness (Patent Document 4). The applicant of the present invention proposed an electric wire coloring apparatus which injects a certain amount of a desired liquid coloring agent and makes a droplet adhered to an outer surface of a single colored electric wire (Patent Document 5).

Each proposed electric wire coloring apparatus includes a coloring unit to inject the liquid coloring agent to the outer surface of the electric wire. The coloring unit has a solenoid valve to actuate or stop the injection of the coloring agent to the outer surface of the electric wire. The solenoid valve is opened and closed by application of voltage to the solenoid.

In the electric wire coloring apparatus of the Patent Document 5, a voltage as shown in FIG. 10 is applied to the solenoid to open the solenoid valve. Firstly, a relatively high voltage A (referred to spike voltage in the present specification) is applied to the solenoid to open the solenoid valve for a given period of time a. After that, a relatively low voltage B (referred to holding voltage in the present specification) lower than the spike voltage A is applied to the solenoid to keep the solenoid valve opened for a given period of time. Thus, when the solenoid valve is opened, the liquid coloring agent is injected to the outer surface of the electric wire. The droplet adhered to the outer surface of the electric wire is dried so that the outer surface is colored in the desired color and is marked.

The related Patent Document are the following: Patent Document 1 JP,H05-111947,A; Patent Document 2 JP,H06-119833,A; Patent Document 3 JP,H09-92056,A; Patent Document 4 Patent Application Number 2001-256721; and Patent Document 5 Patent Application Number 2002-233729.

An electric wire coloring apparatus described in Patent Document 5 can be attached to an electric wire forming apparatus such as an electric wire cutting apparatus which cuts a long electric wire into a given length and attaches terminals to ends thereof. The electric wire forming apparatus moves and stops the electric wire along the longitudinal direction of the wire. Thus, a moving speed of the electric wire rapidly changes.

The electric wire coloring apparatus described above has an encoder to detect the moving speed and distance of the electric wire in order to color an outer surface thereof with a constant pattern regardless of the change of the moving speed. The electric wire coloring apparatus changes the speed (frequency) to open a solenoid valve for coloring the outer surface of the electric wire with the constant pattern responding to the moving speed and distance measured by the encoder.

When a voltage shown in FIG. 10 is applied to a solenoid of the solenoid valve, a droplet mass of a coloring agent intends to increase with the increase of the speed (frequency) to open the solenoid valve even that a spike voltage A and a holding voltage B are applied for given period of time s. When the solenoid valve opens frequently, namely becomes high frequency (the number of open and close per second of the solenoid valve increases), the droplet mass of the coloring agent intends to increase.

Thus, when the voltage as shown in FIG. 10 is conventionally applied to the solenoid of the solenoid valve and the electric wire to be colored by the electric wire forming apparatus changes the moving speed rapidly, the droplet mass to be adhered to the outer surface of the electric wire varies every droplets.

This causes a variation of the area to which the coloring agent is adhered. It becomes difficult to inject the given amount of the coloring agent to the desired position of the outer surface of the electric wire.

DISCLOSURE OF THE INVENTION

It is an object of the present invention to provide an apparatus for coloring an electric wire to inject correctly a given amount of a coloring agent to a desired position of the electric wire.

According to a first aspect of an apparatus for coloring an electric wire, the apparatus includes a coloring unit to inject a liquid coloring agent and make a droplet adhered to an outer surface of the electric wire and color the electric wire. The coloring unit has a solenoid valve to inject or stop injection of the coloring agent to the outer surface of the electric wire by opening or closing the solenoid valve. A spike voltage is applied to a solenoid of the solenoid valve to open the valve and inject the liquid coloring agent to the outer surface of the electric wire, and kept applying to the solenoid to keep the valve opened.

According to a second aspect of the apparatus, the spike voltage is applied to the solenoid for a period of time corresponding to the drop mass.

According to a third aspect of the apparatus, the spike voltage is applied to the solenoid for the period of time ranging from 0.15 msec to 0.5 msec.

According to a fourth aspect of the apparatus, the spike voltage is applied to the solenoid for the period of time ranging from 0.15 msec to 0.3 msec.

According to a fifth aspect of the apparatus, the spike voltage is applied to the solenoid for the period of time ranging from 0.15 msec to 0.25 msec.

According to a sixth aspect of the apparatus, the spike voltage is applied to the solenoid for the period of time ranging from 0.15 msec to 0.2 msec.

According to a first aspect of a method for coloring an electric wire, the method includes that a coloring unit injects a liquid coloring agent and makes a droplet adhered to an outer surface of the electric wire and colors the electric wire. The coloring unit has a solenoid valve to inject or stop injection of the coloring agent to the outer surface of the electric wire by opening or closing the solenoid valve. A spike voltage is applied to the solenoid of the solenoid valve to open the valve and inject the liquid coloring agent to the outer surface of the electric wire, and kept applying to keep the valve open.

According to a second aspect of the method, the spike voltage is applied to the solenoid for a period of time corresponding to the droplet mass.

According to a third aspect of the method, the spike voltage is applied to the solenoid for the period of time ranging from 0.15 msec to 0.5 msec.

According to a fourth aspect of the method, the spike voltage is applied to the solenoid for the period of time ranging from 0.15 msec to 0.3 msec.

According to a fifth aspect of the method, the spike voltage is applied to the solenoid for the period of time ranging from 0.15 msec to 0.25 msec.

According to a sixth aspect of the method, the spike voltage is applied to the solenoid for the period of time ranging from 0.15 msec to 0.2 msec.

According to the first aspect of the apparatus, the spike voltage is applied to the solenoid of the solenoid valve to open the valve and kept applied to inject the coloring agent to the outer surface of the electric wire. The increase of the one droplet mass of the coloring agent is prevented with an increase of an open speed (frequency) of the solenoid valve. The increase of the one droplet mass is prevented even when the solenoid valve has a shorter open period of time, that is, higher frequency (the number of open and close times of the solenoid valve increases, for example, in a second).

In this specification, the coloring agent is liquid material consisting of color material (organic substance for industrial purpose) which is dissolved or dispersed in water or other solvent. As the organic substance, the coloring agent includes dyes and pigments which are generally composites of the organic substances. The dyes may be used as the pigments, or the pigments may be used as the dyes according to cases. As more specific examples, the coloring agent in claims means both coloring liquid and paint. The coloring liquid means the dye which is dissolved or dispersed in the solvent, while the paint means the pigment which is dispersed in dispersion liquid. Therefore, when the coloring liquid is adhered to the outer surface of a sheath, the dye is infiltrated into the sheath. On the other hand, when the paint is adhered to the outer surface of the sheath, the pigment is not infiltrated into the sheath, but simply adhered to the outer surface. Therefore, the method for coloring the outer surface of the electric wire includes both dyeing a part of the outer surface of the electric wire with the dye, and applying the pigment to the part of the outer surface of the electric wire.

Preferably, the solvent and dispersion liquid are compatible with a synthetic resin which forms the sheath. In this case, the dye can be reliably infiltrated into the sheath, and the pigment can be reliably adhered to the outer surface of the sheath.

In this specification, the injection means that the coloring agent is energized and injected in a liquid drop, that is, droplet state to the outer surface of the electric wire through a coloring nozzle.

According to the second aspect of the apparatus, the period of time of the application of the spike voltage to the solenoid, that is, the period of time to open the solenoid valve is varied corresponding to the droplet mass to be injected to the outer surface of the electric wire.

According to the third aspect of the apparatus, the application period of time of the spike voltage to the solenoid of the range from 0.15 msec to 0.5 msec provides assuredly to inject a desired droplet mass to the outer surface of the electric wire.

According to the fourth aspect of the apparatus, the application period of time of the spike voltage to the solenoid of the range from 0.15 msec to 0.3 msec provides assuredly to inject a desired droplet mass to the outer surface of the electric wire.

According to the fifth aspect of the apparatus, the application period of time of the spike voltage to the solenoid of the range from 0.15 msec to 0.25 msec provides assuredly to inject the desired droplet mass to the outer surface of the electric wire.

According to the sixth aspect of the apparatus, the application period of time of the spike voltage to the solenoid of the range from 0.15 msec to 0.2 msec provides assuredly to inject the desired droplet mass to the outer surface of the electric wire.

According to the first aspect of the method, the spike voltage is applied to the solenoid of the solenoid valve to open the valve and kept applied to inject the coloring agent to the outer surface of the electric wire. The increase of the one droplet mass of the coloring agent is prevented even when an open speed (frequency) of the solenoid valve increases. The increase of the one droplet mass is prevented even when the solenoid valve has a shorter open period of time, that is, higher frequency (the number of open and close times of the solenoid valve increases, for example, in a second).

According to the second aspect of the method, the period of time of the application of the spike voltage to the solenoid, that is, the period of time to open the solenoid valve is varied corresponding to the droplet mass to be injected to the outer surface of the electric wire.

According to the third aspect of the apparatus, the application period of time of the spike voltage to the solenoid of the range from 0.15 msec to 0.5 msec provides assuredly to inject a desired droplet mass to the outer surface of the electric wire.

According to the fourth aspect of the apparatus, the application period of time of the spike voltage to the solenoid of the range from 0.15 msec to 0.3 msec provides assuredly to inject a desired droplet mass to the outer surface of the electric wire.

According to the fifth aspect of the apparatus, the application period of time of the spike voltage to the solenoid of the range from 0.15 msec to 0.25 msec provides assuredly to inject the desired droplet mass to the outer surface of the electric wire.

According to the sixth aspect of the apparatus, the application period of time of the spike voltage to the solenoid of the range from 0.15 msec to 0.2 msec provides assuredly to inject the desired droplet mass to the outer surface of the electric wire.

It is preferable to make the period of time of the application of the spike voltage to the solenoid, that is, the period of time to open the solenoid valve longer in order to increase the droplet mass to be injected to the outer surface of the electric wire. It is preferable to make the period of time of the application of the spike voltage to the solenoid, that is, the period of time to open the solenoid valve shorter in order to decrease the droplet mass to be injected to the outer surface of the electric wire.

The present invention provides the apparatus and method for coloring electric wires of wiring harnesses arranged in several machines such as a motor car. The application period of time of the spike voltage to the solenoid to open the valve ranges preferably from 0.15 msec to 0.3 msec. The present invention is utilized for injecting the small amount of the coloring agent to the outer surface of the electric wire in a short time.

BRIEF DESCRIPTION OF THE DRAWINGS

FIG. 5A is a sectional view showing a close state of a solenoid valve of the coloring nozzle shown in FIG. 4;

FIG. 5B is a sectional view showing an open state thereof;

FIG. 6A is a perspective view of the electric wire colored by the apparatus of FIG. 1;

FIG. 6B is a plan view of the electric wire shown in FIG. 6A;

FIG. 7 is an illustration showing a change of one droplet mass of the coloring agent responding to a change of frequency of a voltage applied to a coil for the present invention and a comparative example;

FIG. 9 is an illustration showing a voltage pattern applied to the coil of the coloring nozzle shown in FIG. 4; and FIG. 10 is an illustration showing a conventional voltage pattern applied to a coil of coloring nozzles.

BEST MODE FOR CARRYING OUT THE INVENTION

Figure 1:
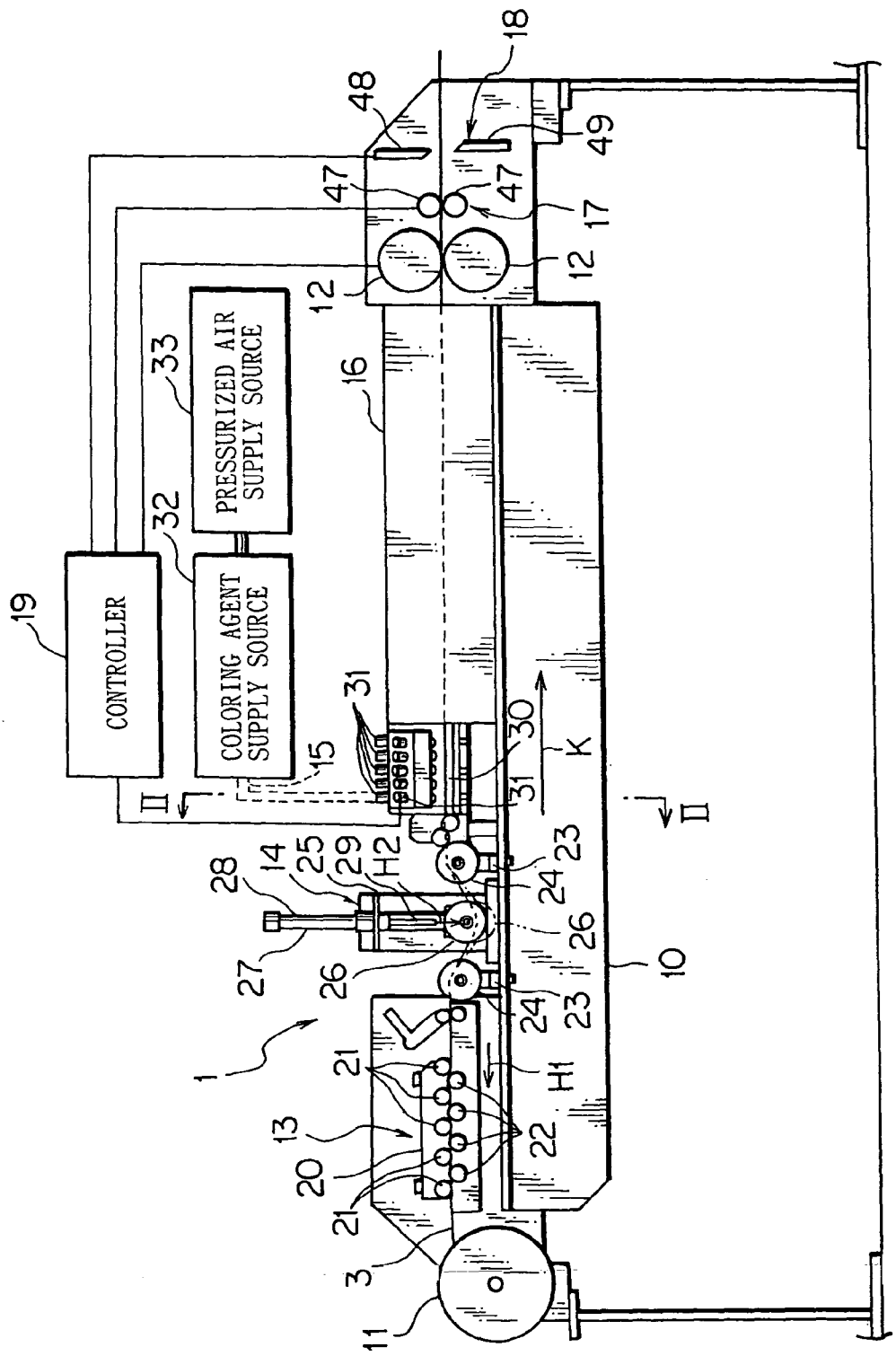
FIG. 1 is a side view of an apparatus for coloring an electric wire of an embodiment according to the present invention.

An apparatus for coloring an electric wire (simply referred to "coloring apparatus" hereafter) according to a first embodiment of the present invention is described referring to FIGS. 1 to 9. The coloring apparatus 1 is employed for forming a mark 6 on a part of an outer surface 3a of an electric wire 3 after cutting the electric wire 3 into a given length. In short, the coloring apparatus 1 colors (marks) the outer surface 3a of the electric wire 3.

The electric wire 3 is one component of a wiring harness to be arranged in a motor car as a moving body. The electric wire 3 includes, as shown in FIG. 6A, a conductive core wire 4 and an insulating sheath 5. The core wire 4 is formed of a plurality of wires twisted together. The wires composing the core wire 4 are made of electrically conductive metal. The core wire 4 can be a single wire. The sheath 5 is formed of, for example, a synthetic resin such as polyvinyl chloride (PVC). Since the sheath 5 covers the core wire 4, the outer surface 3a of the sheath 5 becomes the outer surface of the electric wire 3.

The sheath 5 has a single color P. The color of the outer surface 3a of the sheath 5 is the single color P. In order to give the single color P to the outer surface 3a of the electric wire 3, a coloring agent having a desired color may be admixed to the synthetic resin which forms the sheath 5, or the synthetic resin may not be mixed with the coloring agent so that the color of the synthetic resin itself may constitute the single color P. In case where the color of the synthetic resin itself is the single color P with no coloring agent mixed to the synthetic resin forming the sheath 5, the outer surface 3a of the sheath 5, that is, the outer surface of the electric wire 3 is called as non-coloring. In this manner, the term "non-coloring" means that the outer surface 3a of the electric wire 3 has the color of the synthetic resin itself without mixing the coloring agent into the synthetic resin.

The mark 6 with a plurality of dots 7 is formed on the outer surface 3a of the electric wire 3. The dots 7 have a color of B (shown by parallel diagonal lines in FIGS. 6A and 6B). The color B is different from the single color P. A planar shape of the dots 7 is round as shown in FIG. 6B. The plurality of the dots 7 are arranged in a longitudinal direction of the electric wire 3 with a given pattern. The dots 7 are equally separated along the longitudinal direction of the electric wire 3 in FIGS. 6A and 6B. The distance between the centers of the adjacent dots 7 is predetermined.

A plurality of the electric wires 3 are bundled and ends of the electric wires are connected to connectors to form the wiring harness. The connectors are coupled to connectors of electronic units of various types in a motor car and the wiring harness, that is, the group of the electric wires 3 provides various signals or electric power to the electronic units.

Each color B of the dots 7 in the mark 6 is changed to identify the electric wires 3 each other. FIGS. 6A and 6B show all dots 7 having the same color B, but each dot 7 may have a different color if necessary. The color B of each dot 7 of the mark 6 is utilized to identify kinds and systems of the electric wires 3 of the wiring harness.

The coloring apparatus 1 includes, as shown in FIG. 1, a frame 10 (a main body), a guide roll 11, take-rolls 12 to take-up the electric wire, a straighten unit 13 to straighten the electric wire, a slack absorbing unit 14 to absorb a slack of the electric wire, a coloring unit 15, a duct 16, an encoder 17 for measuring means, a cutter 18, and a controller 19.

The frame 10 is installed on a floor of a factory and extends into a horizontal direction. The guide roll 11 is rotatably attached to one end of the frame 10. The guide roll 11 winds the long electric wire 3 with no mark 6 and sends the electric wire 3 to the straighten unit 13, the slack absorbing unit 14, the coloring unit 15, the duct 16, the encoder 17, and the cutter 18 in order.

The take-up rolls 12 are disposed in the other end of the frame 10. The pair of take-up rolls 12 are rotatably supported by the frame 10 and arranged vertically each other. The take-up rolls 12 are driven by a motor (not shown) and rotate in opposite direction each other with a same rotation number. The pair of take-up rolls 12 sandwich the electric wire 3 between them and pull out the electric wire 3 from the guide roll 11 along the longitudinal direction of the electric wire 3.

The take-up rolls 12 stretch and move the electric wire 3 along the longitudinal direction thereof. Thus, the take-up rolls 12 move the electric wire 3 relative to coloring nozzles 31 of the coloring unit 15 along the longitudinal direction thereof. The electric wire 3 is moved from the guide roll 11 to the take-up rolls 12 along an arrow K in FIG. 1, which is a moving direction of the electric wire 3.

The straighten unit 13 is disposed between the guide roll 11 and the take-up rolls 12. The straighten unit 13 is disposed in a downstream of the guide roll 11 and in a upstream of the take-up rolls 12 of the moving direction K. The straighten unit 13 includes a unit main body 20 with a plate shape, a plurality of first rolls 21, and a plurality of second rolls 22. The unit main body 20 is fixed to the frame 10.

The first and second rolls 21 and 22 are rotatably supported on the unit main body 20. The plurality of the first rolls 21 are arranged horizontally (along the moving direction K) and disposed above the electric wire 3. The plurality of the second rolls 22 are arranged horizontally (along the moving direction K) and disposed below the electric wire 3. The first rolls 21 and the second rolls 22 each are arranged in zigzag as shown in FIG. 1.

The straighten unit 13 sandwiches the electric wire 3, which is moved from the guide roll 11 by the take-up rolls 12, between the first rolls 21 and the second rolls 22. Hence, the straighten unit 13 straightens the electric wire 3 and provides a friction to the electric wire 3 by sandwiching the wire with the first and second rolls 21 and 22. Consequently, the straighten unit 13 provides a biasing force H1 in a direction opposite to a stretching direction (the moving direction K) to which the take-up rolls 12 pull out the electric wire 3. The first biasing force H1 is weaker than the tension pulled by the take-up rolls 12. Then, the straighten unit 13 provides the tension to the electric wire 3 in the longitudinal direction.

The slack absorbing unit 14 is disposed on the take-up rolls 12 side of the straighten unit 13. The slack absorbing unit 14 is disposed in a downstream of the straighten unit 13 and in the upstream of the take-up rolls 12 in the moving direction K of the electric wire 3. The slack absorbing unit 14 is disposed between the straighten unit 13 and the coloring nozzles 31 described below.

The slack absorbing unit 14 includes, as shown in FIG. 1, a pair of guide roll support frames 23, a pair of guide rolls 24, a transfer roll support frame 25, a transfer roll 26, and an air cylinder 27 for biasing means. The guide roll support frames 23 are fixed to the frame 10 and extend upwardly from the frame 10. Each guide roll support frame 23 is separated each other along the moving direction K of the electric wire 3.

The pair of the guide rolls 24 are rotatably supported by the guide roll support frames 23 and disposed at under the electric wire 3 to make an outer circumferential face in contact to the electric wire 3. It results that the guide rolls 24 guide the electric wire 3 not to escape from the moving direction K.

The transfer roll support frame 25 is fixed to the frame 10 and extends upwardly from the frame 10 and is disposed at between the pair of the guide roll support frames 23.

The transfer roll 26 is rotatably supported by the transfer roll support frame 25 and movable vertically. The transfer roll 26 is disposed above the electric wire 3 and movable in a direction perpendicular to the moving direction K of the electric wire 3. The transfer roll 26 is disposed at the middle position between the guide rolls 24.

The air cylinder 27 has a cylinder 28 and an extendable rod 29 in the cylinder 28. The cylinder 28 is fixed to the transfer roll support frame 25 and disposed above the electric wire 3. The extendable rod 29 extends downwardly from the cylinder 28 and approaches to the electric wire 3.

The transfer roll 26 is attached to the extendable rod 29. When a pressurized gas is supplied to inside the cylinder 28, the air cylinder 27 moves the extendable rod 29 downwardly, that is, the transfer roll 26 with a second biasing force H2 (shown in FIG. 1) in a direction perpendicular to the moving direction K. The air cylinder 27 biases the transfer roll 26 to the electric wire 3 with the second biasing force H2 which is weaker than the first biasing force H1.

When a pair of cutting blades 48 and 49 of the cutter 18 cut the electric wire 3, the electric wire 3 is once stopped. It causes a slack of the electric wire 3 between the pair of the guide rolls 24 due to the movement inertia of the electric wire 3 in the moving direction K. On this occasion, since the air cylinder 27 biases the transfer roll 26 with the second biasing force H2 in the slack absorbing unit 14, the extendable rod 29 in the air cylinder 27 extends and displaces the transfer roll 26 to the position shown by a dashed double-dotted line in FIG. 1. Thus, the slack absorbing unit 14 biases the electric wire 3, which is slacked between the guide rolls 24, in the direction perpendicular to the moving direction K and absorbs the slack and keeps to stretch the electric wire 3.

The coloring unit 15 is disposed between the slack absorbing unit 14 and the take-up rolls 12. The coloring unit 15 is disposed in a downstream side of the slack absorbing unit 14 and the upstream side of the take-up rolls 12 of the moving direction K of the electric wire 3. The coloring unit 15, that is, the coloring nozzles 31 are arranged between the take-up rolls 12 and the straighten unit 13.

Figure 2:
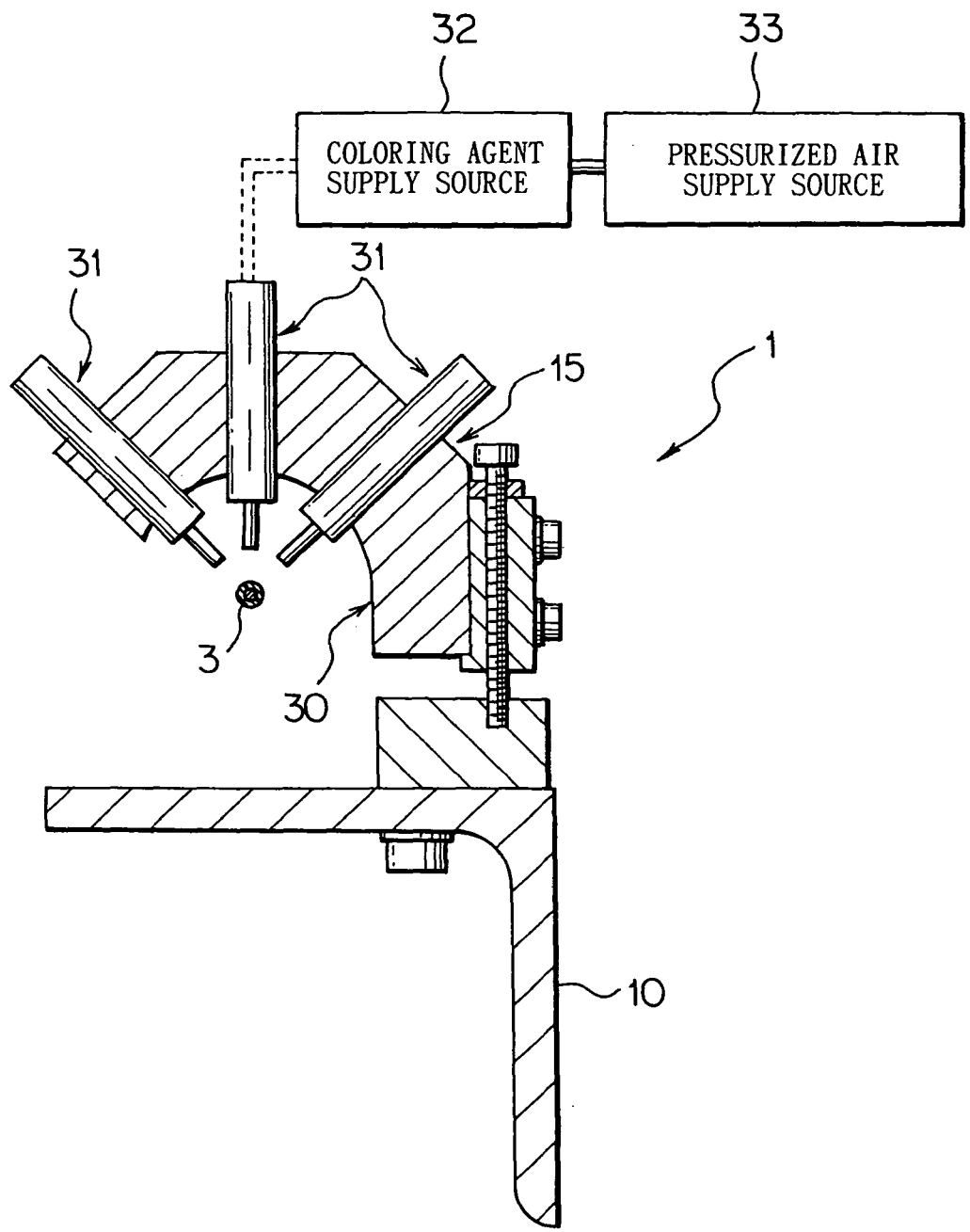
FIG. 2 is a sectional view of a coloring unit of the apparatus taken along a line II-II in FIG. 1.

The coloring unit 15 includes, as shown in FIG. 2, a main body 30, the plurality of the coloring nozzles 31, a plurality of coloring agent supply sources 32 (one source is shown in FIG. 2 and the others are omitted), and pressurized air supply sources 33. The main body 30 is fixed to the frame 10 and supports the plurality of the coloring nozzles 31.

The coloring nozzles 31 each inject a given amount of the liquid coloring agent from the coloring agent supply source 32 to the outer surface 3$a$ of the electric wire 3. The injected droplets of the coloring agent from the coloring nozzles 31 are adhered to the outer surface 3$a$ of the electric wire 3 and color (mark) a part of the outer surface 3$a$. The detail of the coloring nozzles 31 are explained later.

The coloring nozzles 31 are attached to the main body 30. The plurality of the coloring nozzles 31 are arranged in the moving direction K and around the electric wire 3. In the example of FIG. 1, the main body 30 has five coloring nozzles 31 along the moving direction K and three coloring nozzles 31 around the center of the electric wire 3.

Figure 3:
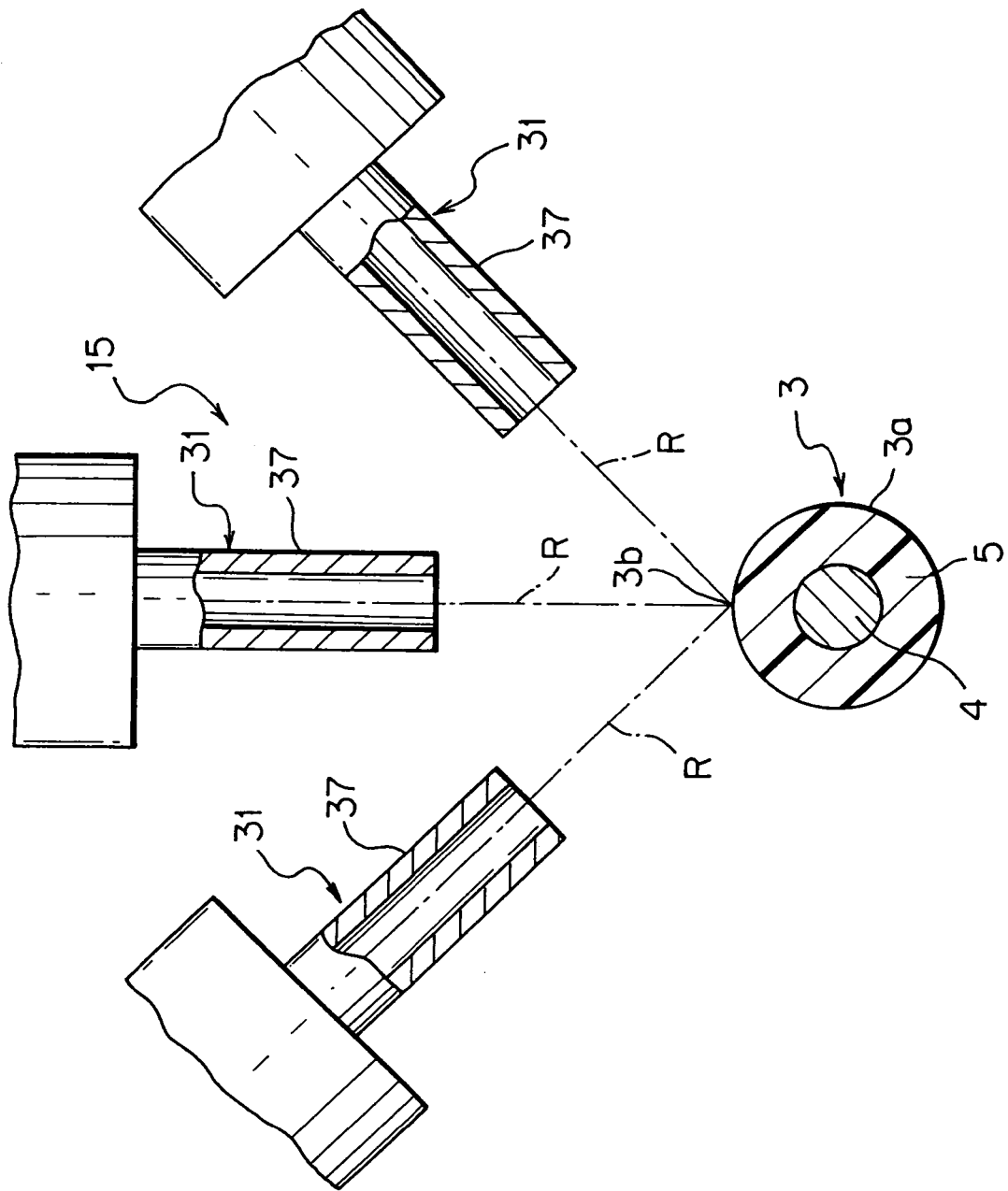
FIG. 3 is an illustration showing a positional relation of each coloring nozzle of the coloring unit and the electric wire shown in FIG. 2.

As shown in FIG. 3, each coloring nozzle 31 is supported by the main body 30 so as that an axis R of a nozzle member 37, shown by a dashed dotted line in FIG. 3, extends to an uppermost position 3$b$ of the electric wire 3. Each coloring nozzle 31 injects the given amount of the coloring agent to the uppermost position 3$b$ of the electric wire 3 along the axis R.

Each coloring agent supply source 32 receives the coloring agent and supplies the coloring agent to an inlet tube 36 of the corresponding coloring nozzle 31. The colors B supplied to the coloring nozzles 31 by the coloring agent supply sources 32 can be different from each other or same.

Each pressurized air supply source 33 supplies the pressurized air to the color agent supply source 32 so that a valve 44 described below is separated from a base end 37$a$ of the nozzle member 37 and the coloring agent in a flow path 39 is injected from the nozzle member 37.

In the coloring unit 15, a spike voltage A is applied to a coil 40 of the coloring nozzle 31 and the valve 44 is separated from the base end 37a of the nozzle member 37 responding to an order from the controller 19. Thereby, the coloring unit 15 injects to the electric wire 3 the given amount of the coloring agent inside the flow path 39 of the coloring nozzle 31.

The coloring agent with the viscosity below 30 mPa's is utilized in the present invention. The coloring agent is liquid material consisting of color material (organic substance for industrial purpose) dissolved or dispersed in water or other solvent. As the organic substance, the coloring agent includes dyes and pigments which are generally composites of the organic substances. The dyes may be used as the pigments, or the pigments may be used as the dyes according to cases. More specifically, the coloring agent is in a form of coloring liquid or paint.

The coloring liquid means the dye dissolved or dispersed in the solvent, while the paint means the pigment dispersed in dispersion liquid. Therefore, when the coloring liquid is adhered to the outer surface 3a of the electric wire 3, the dye is infiltrated into the sheath 5. On the other hand, when the paint is adhered to the outer surface 3a of the electric wire 3, the pigment is not infiltrated into the sheath 5, but simply adhered to the outer surface 3a. In other words, the coloring unit 15 serves to dye the part of the outer surface 3a of the electric wire 3 with the dye, or alternatively, to apply the pigment to the part of the outer surface 3a of the electric wire 3. Therefore, a method for marking the outer surface 3a of the electric wire 3 includes both dyeing the part of the outer surface 3a of the electric wire with the dye, and applying the pigment to the part of the outer surface 3a of the electric wire 3.

Preferably, the solvent and dispersion liquid are compatible with the synthetic resin which forms the sheath 5. In this case, the dye can be reliably infiltrated into the sheath 5, and the pigment can be reliably adhered to the outer surface 3a of the sheath 5.

The injection described means that the liquid coloring agent is energized to be injected to the outer surface 3a of the electric wire 3 with the liquid drop, that is, droplet from the each coloring nozzle 31.

The duct 16 is disposed to the take-up rolls side of the coloring unit 15 and between the coloring unit 15 and the take-up rolls 12. The duct 16 is disposed to a downstream side of the coloring unit 15 in the moving direction K of the electric wire 3 and the upstream side of the take-up rolls 12. The duct 16 is formed in a tubular shape and the electric wire 3 passes therein. Evacuating means (not shown) is connected to the duct 16. The evacuating means evacuates the gas in the duct 16 to prevent the solvent and dispersion liquid in the coloring agent from being filled outside the coloring unit 1.

The encoder 17 is disposed to a downstream side of the take-up rolls 12 in the moving direction K of the electric wire 3. The encoder 17 has a pair of rotors 47 as shown in FIG. 1. Each rotor 47 can rotate around an axis of rotation. An outer circumferential face of each rotor 47 is in contact with the outer surface 3a of the electric wire 3 sandwiched by the pair of the take-up rolls 12. When the core wire 4, that is, the electric wire 3 runs (moves) in the direction of the arrow K, the rotors 47 rotate. In short, the rotors 47 each rotate around the axis with the running (moving) of the core wire 4, that is, the electric wire 3 along the direction of the arrow K. It is apparent that a number of the rotation of each rotor 43 is proportional to the moving distance of the electric wire 3 along the direction of the arrow K.

The encoder 17 is connected to the controller 19. When the rotors 43 rotate by a predetermined angle, the encoder 17 outputs pulse signals to the controller 19. More specifically, the encoder 17 outputs information corresponding to the moving velocity of the electric wire 3 along the direction of the arrow K. In this manner, the encoder 17 measures the information corresponding to the moving velocity of the electric wire 3, and outputs the information to the controller 19. Usually, the encoder 17 outputs the pulse signals according to the moving distance of the electric wire 3 by friction between the electric wire 3 and the rotors 47 of the encoder 17. However, in case where the moving distance is inconsistent with the number of the pulse signals, depending on condition of the outer surface 3a of the electric wire 3, it would be possible to obtain the information of the moving velocity in other places, and to feedback the information for comparative calculation.

The cutter 18 is disposed to a downstream side of the rotors 47 of the encoder 17 in the moving direction K. The cutter 18 has a pair of cutting blades 48 and 49. The pair of the cutting blades 48 and 49 are arranged vertically, and approach or depart from each other in the vertical direction. The pair of the cutting blades 48 and 49 approach each other and sandwich to cut the electric wire 3 moved by the pair of the take-up rolls 12. After cutting, the cutting blades 48 and 49 depart from each other.

The controller 19 is a computer having known RAM, ROM, CPU, and so on. The controller 19 is connected to the take-up rolls 12, encoder 17, cutter 18, and coloring nozzles 31 to control their operations and thereby controls all the operations of the coloring unit 1.

The controller 19 stores a predetermined pattern of the mark 6. When the information of the pulse signals, that is, the amount of the moving distance of the electric wire 3, is input from the encoder 17 to the controller 19, switches of the coloring nozzles 53 turn ON and the spike voltage A, shown in FIG. 9, is applied to coils 40 for a given period of time a and the coloring agents are injected to the electric wire 3 from the coloring nozzles 31.

Figure 4:
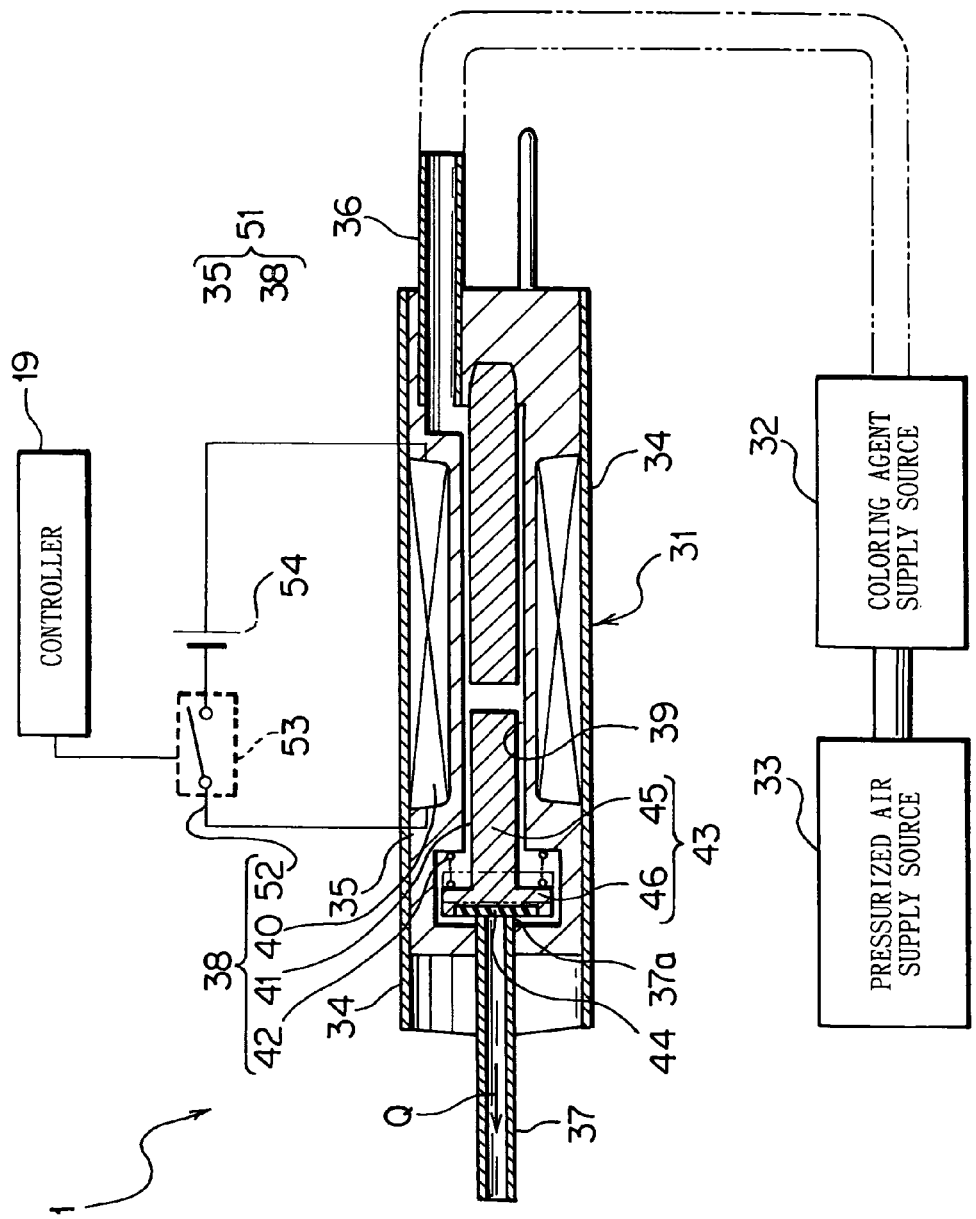
FIG. 4 is an illustration showing a constitution of the coloring nozzle of the coloring unit shown in FIG. 2.

The spike voltage A is applied to the coil 40 to move the valve 44 from a close position, shown by a solid line in FIG. 4 and FIG. 5A, to an open position, shown by a dashed double-dotted line in FIG. 4 and FIG. 5B. The spike voltage A is the voltage to be applied to the coil 40 to open the solenoid valve 51 (to move the valve 44 against a biasing force of a coil spring 42).

The spike voltage A is determined depending on the specification of the coil 40 (for example, maximum voltage). The period of time a of the spike voltage A applied to the coil 40 can be 0.15 msec to 0.3 msec, 0.15 msec to 0.25 msec, or 0.15 msec to 0.2 msec.

The controller 19 applies the spike voltage A to the coil 40 to open the solenoid valve 51 and keeps the spike voltage A to the coil 40 for a given period of time a and thereafter turns OFF the switch 53 to stop the application of the spike voltage A.

The controller 19 can make the injecting period of time of the coloring agent from the coloring nozzles 31 shorter or longer depending on the moving speed of the electric wire 3 with being higher or slower, respectively according to the pattern of the mark 6 stored in the controller 19. Hence, the controller 19 colors the electric wire 3 according to the stored pattern. The controller 19 controls the coloring nozzles 31 to inject the given amount of the coloring agent drop according to the moving distance of the electric wire 3 measured by the encoder 17.

When the controller 19 judges the given amount of the moving distance of the electric wire 3 from the information of the encoder 17, the controller 19 stops the operation of the take-up rolls 12 and brings the pair of the cutting blades 48 and 49 close together to cut the electric wire 3.

Each coloring nozzle 31, as shown in FIG. 4, has a cylindrical nozzle main body 34, the inlet tube 36, the nozzle member 37, and the solenoid valve 51.

The inlet tube 36 is communicated with the flow path 39 and guides the coloring agent from the coloring agent supply source 32 to an insertion member 35 through the flow path 39. The inlet tube 36 guides the coloring agent to the solenoid valve 51.

The nozzle member 37 is formed in a tubular shape and the base end 37a is disposed in the flow path 39 and communicated therewith. The nozzle member 37 guides the coloring agent, which is inside the flow path 39, that is, the solenoid valve 51, to outside of the coloring nozzle 31. The inner diameter of the nozzle member 37 in this embodiment is 65 μm, which is relatively small, and smaller than an inner diameter of the nozzle main body 34, that is, an outer diameter of the flow path 39. The nozzle member 37 is coaxial with the nozzle main body 34 and made of stainless steel. The coloring agent flows inside of the nozzle member 37 along the longitudinal direction parallel to an arrow Q (shown in FIGS. 4 and 6). The arrow Q shows the flowing direction of the coloring agent.

The solenoid valve 51 includes the insertion member 35 received in the nozzle main body 34 and a valve mechanism 38. The insertion member 35 is formed in a tubular shape and has the flow path 39 to flow the coloring agent therein. The flow path 39 is filled with the coloring agent supplied from the coloring agent supply source 32 through the inlet tube 36. The insertion member 35 receives the liquid coloring agent of the present invention.

The valve mechanism 38, as shown in FIG. 4, has the coil 40 as solenoid, the valve 41, the coil spring 42, and a drive circuit 52. The coil 40 is embedded in the insertion member 35 disposed at outside of the flow path 39. The driver circuit 52 applies the voltage to the coil 40. The valve main body 41 includes a conductive main body 43 and the valve 44. The main body 43 has a cylinder 45 and a circular disk 46 connected to one end of the cylinder 45.

The disk 46 opposes to the base end 37a of the nozzle member 37 and a longitudinal direction of the cylinder 45 is parallel to the longitudinal direction of the nozzle main body 34. The main body 43, that is, the valve main body 41 is movable in the longitudinal direction of the cylinder 45, that is, the nozzle main body 34.

The valve 44 is attached to the disk 46 of the main body 43. The valve 44 is received in the insertion member 35. The valve 44 opposes to the base end 37a of the nozzle member 37, and comes in contact to or departs from the base end 37a.

When the valve 44 comes in contact to the base end 37a of the nozzle member 37, the boundary thereof is kept watertight to prevent the coloring agent inside the nozzle member 37 from entering into the nozzle member 37. When the valve 44 departs from the base end 37a, the coloring agent is allowed to be injected to the outer surface 3a of the electric wire 3 through the nozzle member 37.

In this manner, the valve 44 comes in contact to or departs from the base end 37a so that the valve 44 is positioned to the close position, shown by the solid line in FIG. 4 and FIG. 5A, or to the open position, shown by the dashed double-dotted line in FIG. 4 and FIG. 5B. When the valve 44 departs from the base end 37a and is positioned to the open position, the coloring agent is injected to the electric wire 3 through the nozzle member 37.

When the valve 44 comes in contact to the base end 37a and is positioned to the close position, the coloring agent is regulated to be injected to the electric wire 3 through the nozzle member 37. When the valve 44 is positioned to the open or close position, the specification refers to that the solenoid valve 51 is opened or closed, respectively.

The coil spring 42 urges the disk 46, that is, the valve 44 to the base end 37a of the nozzle member 37.

The drive circuit 52 has the switch 53 and a direct-current power source 54. Both the switch 53 and the power source 54 are connected in series with the coil 40. The switch 53 is turned to ON/OFF with the order of the controller 19. The power source 54 applies the spike voltage A to the coil 40. When the switch 53 is turned to ON in the drive circuit 52, the power source 54 applies the spike voltage A to the coil 40.

When the solenoid valve 51 is opened, as shown by the dashed double-dotted line in FIG. 4 and FIG. 5B, the coloring agent droplet is injected to the outer surface 3a of the electric wire 3. When the solenoid valve 51 is closed, as shown by the solid line in FIG. 4 and FIG. 5A, the coloring agent droplet is stopped to be injected to the outer surface 3a of the electric wire 3.

The coloring agent is introduced into the flow path 39 in the coloring nozzle 31 through the inlet tube 36 from the coloring agent supply source 32. When the voltage is not applied to the coil 40, the valve 44 is in contact to the base end 37a of the nozzle member 37 with the biasing force of the coil spring 42 and keeps the coloring agent inside the flow path 39.

When the switch 53 of the drive circuit 52 turns ON and the power source 54 applies the spike voltage A to the coil 40, the valve 44 attached to the disk 46 departs from the base end 37a of the nozzle member 37 against to the biasing force of the coil spring 42. The coloring agent in the flow path 39 flows inside the nozzle member 37 along the arrow Q. The coloring nozzle 31 injects the coloring agent from the nozzle member 37. The spike voltage A is applied to the coil 40 for the predetermined period of time a by the order from the controller 19. Then, the coloring nozzle 31 injects the given amount of the coloring agent to the outer surface 3a of the electric wire 3.

The spike voltage A is applied to the coil 40 for the predetermined period of time a with the order from the controller 19. When the coloring nozzle 31 injects the coloring agent to the outer surface 3a of the electric wire 3, the solenoid valve 51 is opened by the spike voltage A applied to the coil 40. After the spike voltage A is applied to the coil 40 for the given period of time a, the application of the spike voltage A is stopped to close the solenoid valve 51 and stop the injection of the coloring agent droplet.

In order to color the outer surface 3a of the electric wire 3 with the mark 6 by utilizing the coloring apparatus 1, the pattern of the mark 6 to be formed on the outer surface 3a of the electric wire 3 is input to the controller 19. Then, the spike voltage A and the period of time a to be applied to the coil 40 are input to the controller 19 to form each dot 7.

The guide roll 11 is attached to the frame 10. The pair of the cutting blades 48 and 49 are set separated each other. The electric wire 3 wound on the guide roll 11 is passed thorough the straighten unit 13, the slack absorbing unit 14, the coloring unit 15, and the duct 16 in order, and sandwiched between the pair of the take-up rolls 12. The coloring nozzles 31 are attached to a given position of the unit main body 30 of the coloring unit 15 and each coloring nozzle 31 is connected to the coloring agent supply source 32. Each coloring agent supply source 33 is connected to the corresponding pressurized air supply source 33 and the evacuating means is connected to the duct 16.

The take-up rolls 12 are driven to pull out the electric wire 3 from the guide roll 11 and moves the electric wire 3 along the longitudinal direction. The friction as the first biasing force H1 is provided to the electric wire 3 by the straighten unit 13 to pull out the electric wire 3. The air cylinder 27 biases the transfer roll 26, that is, the electric wire 3 with the second biasing force H2.

When the predetermined pulse signals are input to the controller 19 from the encoder 17, the controller 19 controls to apply the spike voltage A for the given period of time a with a given time interval to the coils 40 of the predetermined coloring nozzles 31. Hence, each coloring nozzle 31 injects the given amount of the coloring agent to the outer surface 3a of the electric wire 3.

The solvent or dispersion liquid evaporates from the coloring agent adhered to the outer surface 3a of the electric wire 3 and the outer surface 3a of the electric wire 3 is dyed with the dye or painted with the pigment. The evaporated solvent or dispersion liquid is evacuated by the evacuating means from the duct 16. Thereby, the outer surface 3a of the electric wire 3 is colored.

When the given length of the electric wire 3 is moved, the controller 19 judges it from the information of the encoder 17 and stops the take-up rolls 12. It causes the slack of the electric wire 3 especially between the pair of the guide rolls 24 of the slack absorbing unit 14 and the transfer roll 26 biased with the second biasing force H2 is displaced to a position shown by the dashed double-dotted line in FIG. 1. The extendable rod 29 of the air cylinder 27 of the slack absorbing unit 14 extends and absorbs the slack of the electric wire 3.

The pair of the cutting blades 48 and 49 come close to each other and sandwich the electric wire 3 between them to cut. Thereby, the electric wire 3 marked with the mark 6 on the outer surface 3a thereof is obtained as shown in FIGS. 6A and 6B.

In order to change the size of each dot 7 of the mark 6, the period of time a applied to the coil 40 for the spike voltage A is changed. The application period of time a of the spike voltage A to the coil 40, that is, the opened period of time a of the solenoid valve 51 is changed according to the mass, that is, the size of each dot 7 of the mark 6 to be injected to the outer surface 3a of the electric wire 3. The spike voltage A to the coil 40 is continued to apply in accord with the size of the dot 7 on the outer surface 3a of the electric wire 3. A long period of time a forms a large size dot 7 and a short period of time a forms a small size dot 7.

According to the present embodiment, after the spike voltage A is applied to the coil 40 of the solenoid valve 51 to open the solenoid valve 51, the coloring agent is continuously injected to the outer surface 3a of the electric wire 3. A voltage lower than the spike voltage A is not applied to the coil 40 during opening the solenoid valve 51, that is, the injection of the coloring agent.

For this reason, it is prevented the one droplet mass of the coloring agent from increasing even when the open speed (frequency) of the solenoid valve 51 increases. It is prevented the one droplet mass of the coloring agent from increasing for a small interval time of open, that is, higher frequency (the increase of the number of open and close of the solenoid valve 51 at a given period of time, for example, one second) of the solenoid valve 51. Thereby, the given amount of the coloring agent can be injected assuredly to the outer surface 3a of the electric wire 3 and keep the colored point, that is, each dot 7 of the mark 6 to the desired area (size).

The application period of time a, that is, the opening period of time of the solenoid valve 51, of the spike voltage A applied to the coil 40 is changed corresponding to the droplet mass, that is, the size of the dots 7 of the mark 6 to be injected to the outer surface 3a of the electric wire 3. Then, the droplets with the desired mass are injected to the outer surface 3a of the electric wire 3. The desired area (size) of the colored points, that is, each dot 7 of the mark 6 is obtained.

While the electric wire 3 is moving relative to the coloring nozzles 31, the coloring nozzles 31 inject the given amount of the coloring agents to the electric wire 3. Therefore, it is not necessary to stop the electric wire 3 to color the electric wire 3, then resulting that the working efficiency is not reduced. Since the given amount of the coloring agent is injected to the electric wire 3 moving relatively to the coloring nozzles 31, the coloring can be made on any positions or continuously on the electric wire 3.

The encoder 17 measures the moving distance of the electric wire 3 and the controller 19 controls the coloring nozzles 31 responding to the moving distance. The time interval of the coloring agent injection becomes shorter or longer with the moving speed of the electric wire 3 faster or slower, respectively. Then, the distance between the adjacent dots adhered to the outer surface 3a of the electric wire 3 can be kept constant even when the moving speed of the electric wire 3 changes.

The given pattern is adhered to, that is, colored to the outer surface 3a of the electric wire 3 with the coloring agent even when the moving speed of the electric wire 3 changes.

The applicant checked the effect of the present invention by applying continuously the spike voltage A to the coil 40 of the coloring nozzle 31. FIG. 7 shows the result. A comparative example shown by a dashed dotted line is one droplet mass of the coloring agent injected with the change of the speed (frequency) of the voltage having the pattern of FIG. 10 applied to the coil 40 of the coloring nozzle 31. The one droplet mass of the injected coloring agent is measured with the change of the frequency (for example, per second) applied to the coil 40 according to the pattern of FIG. 10.

In the comparative example, the spike voltage A is applied to the coil 40 for the given period of time a to open the solenoid valve 51. The voltage is then changed to the holding voltage B lower than the spike voltage A. The holding voltage B applied to the coil 40 is for keeping the solenoid valve 51 open. The holding voltage B is stopped after a period of time b of the application of the spike voltage A to the coil 40.

In the comparative example, the application period of time a of the spike voltage A is 0.15 msec and the period of time b, which is the period of time after the application of the spike voltage A, is 0.25 msec.

The present invention shown by a solid line in FIG. 7 is the one droplet mass of the coloring agent injected with the change of the speed (frequency) of the voltage having the pattern of FIG. 9 applied to the coil 40 of the coloring nozzle 31. The one droplet mass of the injected coloring agent is measured with the change of the frequency (for example, per second) applied to the coil 40 according to the pattern of FIG. 9.

In the present invention, the spike voltage A is applied to the coil 40 for the given period of time a to open the solenoid valve 51 and stopped. The application period of time a of the spike voltage A to the coil 40 of the present invention is 0.15 msec.

The abscissa axis of FIG. 7 is the speed (frequency), that is, the number of the voltage applied to the coil 40, for example, in a second. The ordinate of FIG. 7 is a ratio of the one droplet mass of the actually injected coloring agent from the coloring nozzle 31 to the desired droplet mass. The ordinate value is obtained by multiplying the ratio by 100.

FIG. 7 was obtained from the experiment in which the coloring agent with viscosity of 30 mPa·sec was injected from the nozzle member 37 with an inner diameter of 65 μm.

The comparative example shown by the dashed dotted line in FIG. 7 shows that the one droplet mass increases rapidly with the increase of frequency. Contrary to this, the present invention shown by the solid line in FIG. 7 shows that the injected one droplet mass from the coloring nozzle 31 is kept within plus or minus 5% to the desired one droplet mass of the coloring agent. As shown in FIG. 7, the present invention clearly shows that the one droplet mass injected changes hardly with the increase of frequency.

According to the result of the experiment shown in FIG. 7, the increase number for applying the spike voltage A to the coil 40, for example, per second, that is, the increase number of the injection of the coloring nozzle 31 within the given period of time does not change the one droplet mass of the coloring agent injected. The increase of the one droplet mass of the coloring agent was prevented. It was cleared that the single application of the spike voltage A to the coil 40 achieved to inject the constant amount of the coloring agent onto the outer surface 3a of the electric wire 3 and keep the dots 7 of the mark 6 to the desired area (size).

Figure 8:
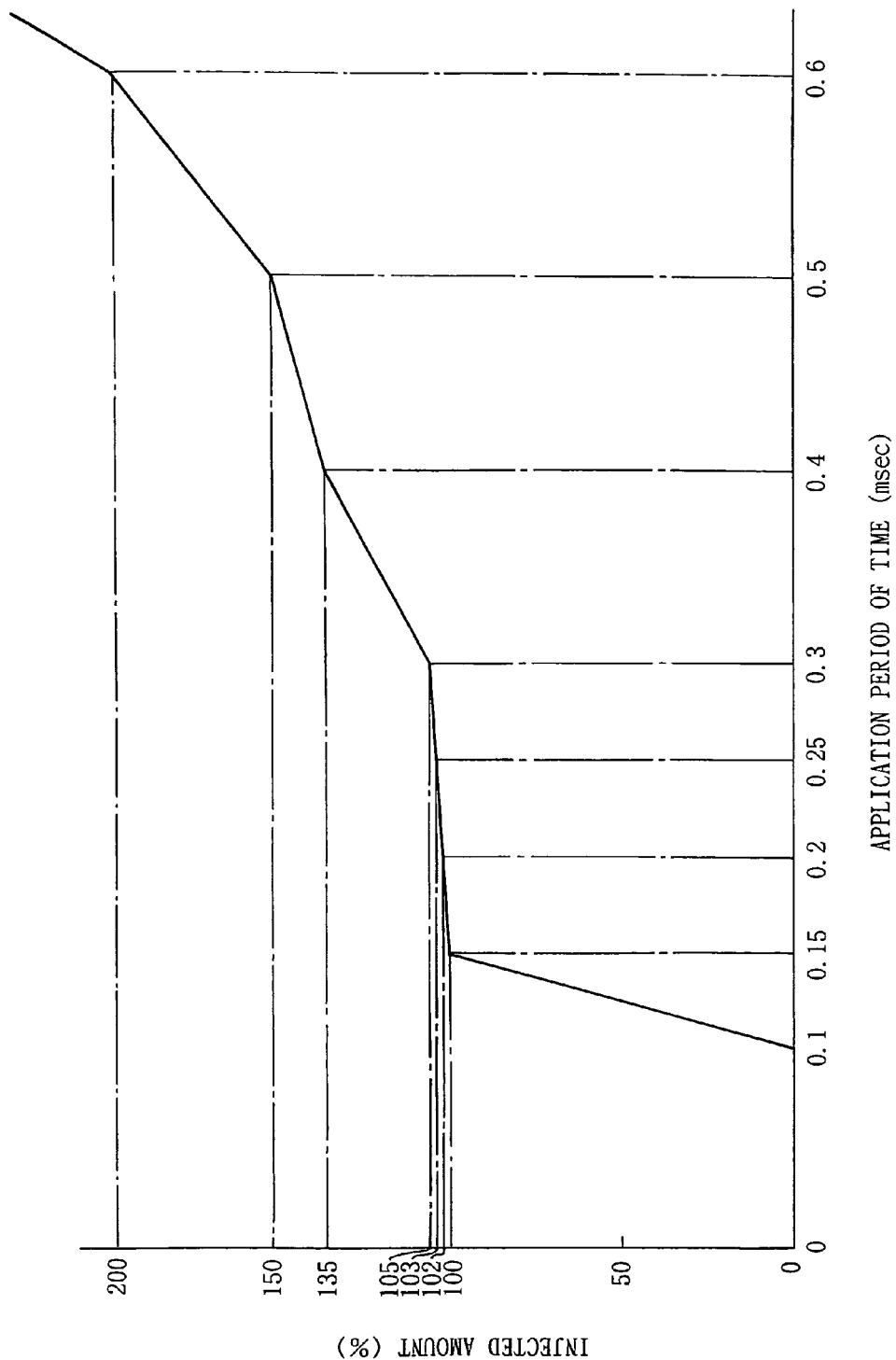
FIG. 8 is an illustration showing the change of the one droplet mass of the coloring agent responding to a change of period of time of a spike voltage applied to the coil of the coloring nozzles shown in FIG. 4.

The droplet mass of the injected coloring agent was measured by changing the period of time a to apply the spike voltage A of the pattern in FIG. 9 to the coil 40 of the coloring nozzle 31. FIG. 8 shows the result.

The speed (frequency) of the spike voltage A applied to the coil 40 was 2 KHz.

The abscissa axis of FIG. 8 is the period of time a of the spike voltage A applied to the coil 40. The ordinate of FIG. 8 is the ratio of one droplet mass of the actually injected coloring agent from the coloring nozzle 31 to the desired droplet mass. The ordinate value is obtained by multiplying the ratio by 100.

FIG. 8 was obtained from the experiment in which the coloring agent with viscosity of 30 mPa·sec was injected from the nozzle member 37 with the inner diameter of 65 μm.

FIG. 8 shows that the one droplet mass increases rapidly at less than 0.15 msec and above 0.5 msec with the increase of the period of time a of the spike voltage A applied. On the other hand, the ratio of the one droplet mass injected from the coloring nozzle 31 to the desired droplet mass is kept within plus 50% in the range from 0.15 msec to 0.5 msec.

When the period of time a is selected in the range from 0.15 msec to 0.5 msec, the diameter of the dots 7 has a maximum variation of about 22%. It was cleared that the period of the application time of the spike voltage A of from 0.15 msec to 0.5 msec provided almost the same area (size) of the dots 7 formed by the coloring agent.

The result of the experiment in FIG. 8 confirms that the period of the application time of the spike voltage A of from 0.15 msec to 0.5 msec injects the coloring agent to the outer face 3a of the electric wire 3 with the given amount of droplet and forms the desired area (size) of the dots 7 of the mark 6.

FIG. 8 shows that the ratio of the one droplet mass injected from the coloring nozzle 31 to the desired droplet mass is kept within plus or minus 5% in the range from 0.15 msec to 0.3 msec. If the spike voltage A is applied for the period of time ranging from 0.15 msec to 0.3 msec, the one droplet mass hardly changes.

According to the result of the experiment shown in FIG. 8, if the period of time for applying the spike voltage A ranges from 0.15 msec to 0.3 msec, the one droplet mass of the coloring agent injected hardly changes. The change of the one droplet mass of the coloring agent was prevented. It is cleared that the application period of time a ranging from 0.15 msec to 0.3 msec of the spike voltage A can achieve to inject the constant amount of the coloring agent to the outer surface 3a of the electric wire 3 and keep the dots 7 of the mark 6 to the desired area (size).

According to FIG. 8, it is cleared that the application period of time a ranging from 0.15 msec to 0.25 msec of the spike voltage A can assuredly achieve to inject the constant amount of the coloring agent to the outer surface 3a of the electric wire 3 and keep the dots 7 of the mark 6 to the desired area (size). It is also cleared that the application period of time a ranging from 0.15 msec to 0.2 msec of the spike voltage A can assuredly achieve to inject the constant amount of the coloring agent to the outer surface 3a of the electric wire 3 and keep the dots 7 of the mark 6 to the desired area (size).

In the present invention, acrylic paint, ink (dye or pigment), and UV ink can be utilized as the coloring liquid and paint.

The embodiments described above show only the representatives of the present invention and are not limited to them. Modifications of the present invention are made possible without departing from the scope of the present invention.

Industrial Applicability

According to the invention, the increase of the one droplet mass of the coloring agent is prevented even when the open speed (frequency) of the solenoid valve increases. Thereby, the given amount of the coloring agent is assuredly injected to the outer surface of the electric wire so as to keep colored points with the desired area (size).

According to the invention, the desired droplet mass can be injected to the outer surface of the electric wire. Thereby, besides the effect of claim 1, the area (size) of the colored points can be varied.

According to the invention, the desired droplet mass can be assuredly injected to the outer surface of the electric wire. Thereby, the area (size) of the colored points can be assuredly varied.

According to the invention, the desired droplet mass can be assuredly injected to the outer surface of the electric wire. Thereby, the area (size) of the colored points can be assuredly varied.

According to the invention, the desired droplet mass can be assuredly injected to the outer surface of the electric wire. Thereby, the area (size) of the colored points can be assuredly varied.

According to the invention, the desired droplet mass can be assuredly injected to the outer surface of the electric wire. Thereby, the area (size) of the colored points can be assuredly varied.

According to the invention, the increase of the one droplet mass of the coloring agent is prevented even when the open speed (frequency) of the solenoid valve increases. Thereby, the given amount of the coloring agent is assuredly injected to the outer surface of the electric wire so as to keep colored points with the desired area (size).

According to the invention, the desired droplet mass can be injected to the outer surface of the electric wire. Thereby, besides the effect of claim 1, the area (size) of the colored points can be varied.

According to the invention, the desired droplet mass can be assuredly injected to the outer surface of the electric wire. Thereby, the area (size) of the colored points can be assuredly varied.

According to the invention, the desired droplet mass can be assuredly injected to the outer surface of the electric wire. Thereby, the area (size) of the colored points can be assuredly varied.

According to the invention, the desired droplet mass can be assuredly injected to the outer surface of the electric wire. Thereby, the area (size) of the colored points can be assuredly varied.

According to the invention, the desired droplet mass can be assuredly injected to the outer surface of the electric wire. Thereby, the area (size) of the colored points can be assuredly varied.

The invention claimed is:

1. A method for coloring an electric wire consisting of the steps of:
providing a coloring unit having a main body supporting a plurality of nozzles around the center of the electric wire and a plurality of nozzles along a longitudinal direction of the electric wire, each nozzle comprising a nozzle main body having disposed therein, a solenoid valve having a coil and a conductive main body that is moved when a voltage is applied to the coil, and a nozzle member having a tubular shape of uniform diameter, and for each nozzle:
supplying a liquid coloring agent from a coloring agent supply source to the nozzle through a single supply conduit having a single passage, with said single supply conduit being free of any devices;
injecting the liquid coloring agent through the nozzle member to an uppermost position of the electric wire along an axis of the nozzle member by using the coloring unit;
making a droplet of the coloring agent to be adhered on the electric wire by using the coloring unit;
opening or closing the solenoid valve disposed in the nozzle main body to inject or stop injection of the droplet of the coloring agent to the uppermost position of the electric wire, wherein a valve disposed on the conductive main body of the solenoid valve contacts a base end of the nozzle member of the nozzle, the other end of the nozzle member being an opening for injecting the coloring agent to the electric wire; and
applying solely a spike voltage to the coil of the solenoid valve to open the valve, the spike voltage having a constant voltage with a pulse width of from 0.15 msec. to less than 0.5 msec., which corresponds to injection of a predetermined droplet mass, so as to form a single row of spaced dots on the uppermost position of the electric wire,
wherein the distance between adjacent spaced individual dots is kept constant even when the moving speed of the electric wire through the coloring apparatus changes, and
wherein the single row of the spaced dots is formed on the uppermost position of the electric wire with all of the nozzles.

2. The method as claimed in claim 1, wherein said spike voltage is applied to the solenoid for the period of time ranging from 0.15 msec to 0.3 msec.

3. The method as claimed in claim 1, wherein said spike voltage is applied to the solenoid for the period of time ranging from 0.15 msec to 0.25 msec.

4. The method as claimed in claim 1, wherein said spike voltage is applied to the solenoid for the period of time ranging from 0.15 msec to 0.2 msec.

* * * * *